(12) United States Patent
Ni et al.

(10) Patent No.: US 10,387,346 B2
(45) Date of Patent: Aug. 20, 2019

(54) DYNAMIC PCIE SWITCH RECONFIGURATION MECHANISM

(71) Applicant: Quanta Computer Inc., Taoyuan (TW)

(72) Inventors: Hsiao-Tsu Ni, Taoyuan (TW); Shuen-Hung Wang, Taoyuan (TW); Chia-Ju Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 67 days.

(21) Appl. No.: 15/149,032

(22) Filed: May 6, 2016

(65) Prior Publication Data

US 2017/0322899 A1 Nov. 9, 2017

(51) Int. Cl.
  *G06F 13/40* (2006.01)
  *G06F 12/02* (2006.01)
  *G06F 13/42* (2006.01)

(52) U.S. Cl.
  CPC ...... *G06F 13/4022* (2013.01); *G06F 12/0246* (2013.01); *G06F 13/4282* (2013.01); *G06F 2212/7202* (2013.01)

(58) Field of Classification Search
  None
  See application file for complete search history.

(56) References Cited

U.S. PATENT DOCUMENTS

| 2006/0174048 | A1 | 8/2006 | Ohara et al. | |
|---|---|---|---|---|
| 2008/0195792 | A1* | 8/2008 | Teil | G06F 13/4072 710/313 |
| 2008/0240230 | A1* | 10/2008 | Oxman | H04N 5/4401 375/240.01 |
| 2011/0012661 | A1* | 1/2011 | Binder | A63F 9/24 327/276 |
| 2013/0031390 | A1* | 1/2013 | Smith, III | G06F 1/206 713/320 |
| 2014/0281057 | A1* | 9/2014 | Cohen | G06F 3/061 710/52 |

(Continued)

FOREIGN PATENT DOCUMENTS

| CN | 2606396 Y | 3/2004 |
|---|---|---|
| CN | 1592895 A | 3/2005 |

(Continued)

OTHER PUBLICATIONS

JP Office Action for Application No. 2017-087142, dated Mar. 6, 2018, w/ First Office Action Summary.

(Continued)

*Primary Examiner* — Henry Tsai
*Assistant Examiner* — Christopher A Bartels
(74) *Attorney, Agent, or Firm* — Nixon Peabody LLP; Zhou Lu

(57) ABSTRACT

A system and method for dynamic reconfiguration of at least one peripheral bus switch of a system includes a management controller that detects whether a server system is connected to each peripheral bus slot of the system. The management controller selects a peripheral bus switch topology for the at least one peripheral bus switch, based on the detecting. The management controller sets each port of the at least one peripheral bus switch to either an upstream port configuration or a downstream port configuration, based on the peripheral bus switch topology.

15 Claims, 7 Drawing Sheets

(56) References Cited

U.S. PATENT DOCUMENTS

| | | | |
|---|---|---|---|
| 2015/0058642 A1* | 2/2015 | Okamoto | G06F 13/14 713/300 |
| 2015/0071292 A1* | 3/2015 | Tripathi | H04L 45/66 370/392 |
| 2015/0120874 A1* | 4/2015 | Kim | H04L 67/1097 709/218 |
| 2016/0147628 A1* | 5/2016 | Arroyo | G06F 11/2247 714/43 |
| 2017/0118071 A1* | 4/2017 | Rasor | H04L 41/0672 |
| 2017/0235701 A1* | 8/2017 | Pethe | G06F 13/4027 710/313 |

FOREIGN PATENT DOCUMENTS

| | | |
|---|---|---|
| CN | 1811744 A | 8/2006 |
| CN | 1320469 C | 6/2007 |
| CN | 102819517 A | 12/2012 |
| CN | 104598403 A | 5/2015 |
| JP | 2006209456 A | 8/2006 |

OTHER PUBLICATIONS

CN Office Action for Application No. 201610659018.1, dated Apr. 1, 2019, w/ First Office Action Summary.
CN Search Report for Application No. 201610659018.1, dated Apr. 1, 2019, w/ First Office Action.

* cited by examiner

700

710

DETECTING WHETHER A SERVER SYSTEM IS CONNECTED TO EACH PERIPHERAL BUS SLOT OF A SYSTEM

720

SELECTING A PERIPHERAL BUS SWITCH TOPOLOGY FOR THE AT LEAST ONE PERIPHERAL BUS SWITCH, BASED ON THE DETECTING

730

SETTING EACH PORT OF THE AT LEAST ONE PERIPHERAL BUS SWITCH TO EITHER AN UPSTREAM PORT CONFIGURATION OR A DOWNSTREAM PORT CONFIGURATION, BASED ON THE PERIPHERAL BUS SWITCH TOPOLOGY

FIG. 7

DYNAMIC PCIE SWITCH RECONFIGURATION MECHANISM

BACKGROUND

Field

This application relates to server systems, and more particularly to a system and method for dynamic reconfiguration of peripheral bus switches.

Background

Desktop and gaming computers often conserve central processing unit (CPU) resources by employing a graphics subsystems dedicated to drive one or more computer displays. A graphics processing unit (GPU) is at the heart of the graphics subsystem. The CPU is a general purpose processor designed to efficiently run a great variety of algorithms. Graphics processing, however, consists of a limited and well known set of algorithms. GPUs are specialized processors that are very good at graphics processing but not necessarily good at other tasks.

As computer systems have advanced, graphics processing units (GPUs) have become increasingly advanced both in complexity and computing power. As a result of this increase in processing power, GPUs are now capable of executing both graphics processing and more general computing tasks.

A recent innovation is general purpose graphics processing unit computing (GPGPU). The graphics capabilities of GPUs also make them ideal for other mathematically intensive applications. The major graphics chip producers have begun supporting the use of GPUs for non-graphics applications. This is sometimes referred to as GPU acceleration.

Typically, to build a GPGPU server, an administrator would install a GPU card into a server that has the prerequisite peripheral bus slot space and bandwidth to accommodate the GPU card. However, most servers only have a small number of peripheral bus slots.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a method for dynamic reconfiguration of at least one peripheral bus switch of a system includes a management controller detecting whether a server system is connected to each peripheral bus slot of the system. The management controller selects a peripheral bus switch topology for the at least one peripheral bus switch, based on the detecting. The management controller sets each port of the at least one peripheral bus switch to either an upstream port configuration or a downstream port configuration, based on the peripheral bus switch topology.

In some implementations, a system includes at least one peripheral bus switch, each connected to a peripheral bus slot. The system includes a least one graphics processing unit connected to a downstream port of the at least one peripheral bus switch. The system further includes a management controller connected to the at least one peripheral bus switch, the management controller configured to: detect whether a server system is connected to each peripheral bus slot, select a peripheral bus switch topology for the at least one peripheral bus switch, based on the detecting, and set each port of the at least one peripheral bus switch to either an upstream port configuration or a downstream port configuration, based on the peripheral bus switch topology.

BRIEF DESCRIPTION OF THE DRAWINGS

These and other sample aspects of the present technology will be described in the detailed description and the appended claims that follow, and in the accompanying drawings, wherein:

FIG. 7 illustrates an example method for dynamic reconfiguration of peripheral bus switches.

DETAILED DESCRIPTION

The subject disclosure provides techniques for dynamic reconfiguration of peripheral bus switches. Various aspects of the present technology are described with reference to the drawings. In the following description, for purposes of explanation, numerous specific details are set forth in order to provide a thorough understanding of one or more aspects. It is evident, however, that the present technology can be practiced without these specific details. In other instances, well-known structures and devices are shown in block diagram form in order to facilitate describing these aspects.

The subject disclosure provides a method for dynamic reconfiguration of peripheral bus switches for use with GPGPU. The method allows for flexible adaptation of a server system as a specialized GPGPU server including a large number of GPUs. The specialized GPGPU server can serve GPU resources to other servers.

Figure 1:
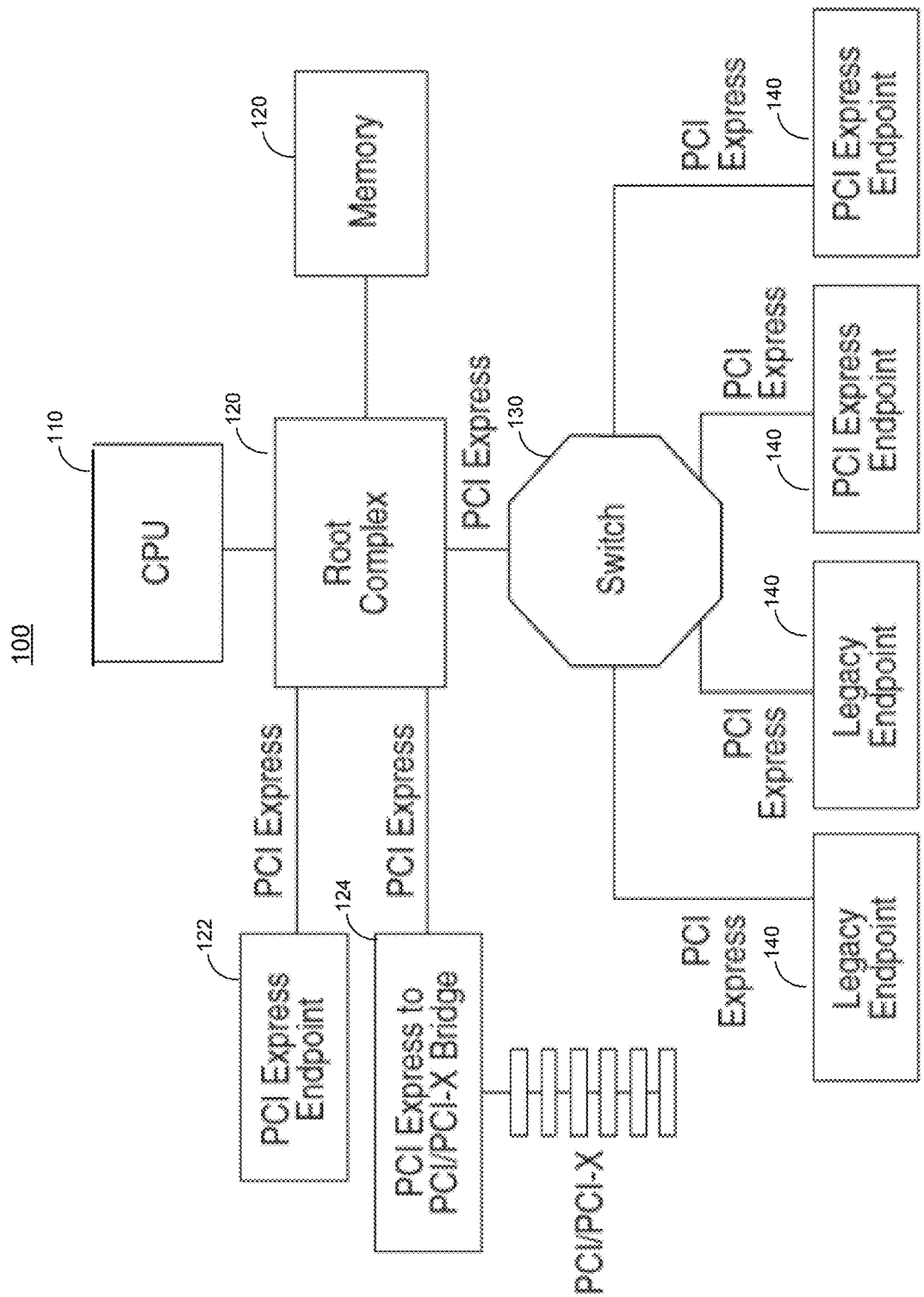
FIG. 1 illustrates a block diagram of an example Peripheral Component Interconnect Express (PCIe) architecture.

FIG. 1 illustrates a block diagram of an example Peripheral Component Interconnect Express (PCIe) architecture 100. PCIe is a high-speed serial computer expansion bus standard, designed to replace the older PCI, PCI-X, and AGP bus standards. PCIe operates in consumer, server, and industrial applications, as a motherboard-level interconnect to link motherboard-mounted peripherals, a passive backplane interconnect, and as an expansion card interface for add-in boards.

It is to be understood that the subject disclosure uses PCIe over other peripheral architectures and bus standards only for ease of illustration. As such, the invention disclosed can also be implemented with other peripheral architectures and bus standards.

In most modern computers, from consumer laptops and desktops to enterprise data servers, the PCIe bus serves as the primary motherboard-level interconnect, connecting the host system-processor with both integrated-peripherals (surface-mounted ICs) and add-on peripherals (expansion cards). In most of these systems, the PCIe bus co-exists with one or more legacy PCI buses, for backward compatibility with the large body of legacy PCI peripherals.

PCI Express bus link supports full-duplex communication between any two endpoints, with no inherent limitation on concurrent access across multiple endpoints. PCIe devices communicate via a logical connection called an interconnect or link. A link is a point-to-point communication channel between two PCIe ports allowing both of them to send and receive ordinary PCI requests (configuration, Input/Output, or memory read/write) and interrupts. At the physical level, a link is composed of one or more lanes. Low-speed peripherals (such as an 802.11 Wi-Fi card) use a single-lane (×1) link, while a GPU typically uses a much wider and faster 16-lane link (×16).

A PCIe card, such as a GPU card, fits into a slot of its physical size or larger (with ×16 as the largest used), but may not fit into a smaller PCIe slot. For example, a ×16 card may not fit into a ×4 or ×8 PCIe slot. Some slots use open-ended sockets to permit physically longer cards and negotiate the best available electrical and logical connection.

The example architecture 100 includes a central processing unit (CPU) 110, a root complex 120, a memory 120, a PCIe switch 130, and multiple PCIe endpoints 122, 124, 140.

The root complex 120 is the interface between the CPU 110 and the PCIe buses may contain several components (processor interface, DRAM interface, etc.) and possibly even several chips. The root complex 120 may support one or more PCIe ports called root ports and logically aggregates PCIe hierarchy domains into one single PCIe hierarchy. The root complex 120 includes a number of root ports to connect to the CPU 110, the PCIe switch 130, and PCIe endpoints by PCIe links. Each root port defines a separate hierarchy domain that includes a single endpoint or a sub-hierarchy containing one or more switch components and endpoints 122, 124, 140.

The PCIe switch 130 allows more devices to be attached to a single root port. The PCIe 130 functions as a packet router and recognizes which path a given packet needs to take based on its address or other routing information. The PCIe switch 130 may have several downstream ports (leading to endpoints but only one upstream port (leading to the root complex 120). A PCIe bridge 124 provides an interface to other buses, such as PCI or PCI-X, or even another PCIe bus. Upstream refers to data flowing from an endpoint 122, 124, 140 to the CPU 110, while downstream refers to data flowing from the CPU 110 to an endpoint 122, 124, 140.

PCIe endpoint devices, such as GPUs, can connect to the endpoints 122, 124, 140. PCIe endpoint devices reside at the bottom of the branches of the PCIe tree topology and typically include a single upstream port facing toward the root complex.

Figure 2:
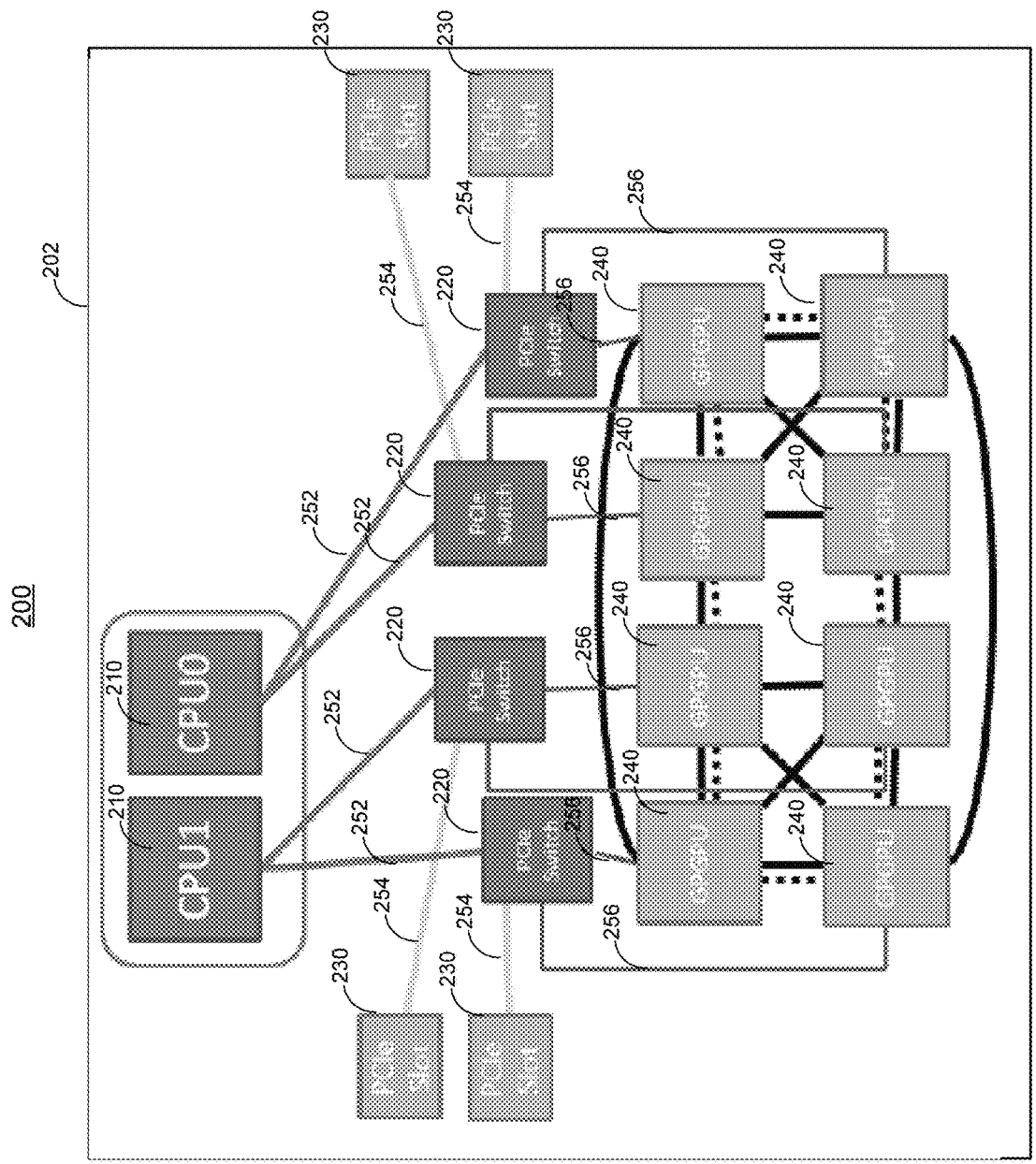
FIG. 2 illustrates a block diagram of a first example system configuration for dynamic reconfiguration of peripheral bus switches.

FIG. 2 illustrates a block diagram of a first example system configuration 200 for dynamic reconfiguration of peripheral bus switches. A server 202 includes one or more processors 210, PCIe switches 220, PCIe slots 230, and GPUs 240. The system configuration 200 is representative of a GPGPU server 202 that includes both CPUs and GPUs, rather a GPGPU server that does not include CPUs. The GPGPU server of the system configuration 200 generally does not provide other servers with GPU resources.

The PCIe switches 220 direct data between the processors 210 and the PCIe endpoints (i.e., the PCIe slots 252 and GPUs 240). Each PCIe switch 220 includes multiple ports for connecting to other components in the system. Each PCIe switch 220 includes one or more downstream ports that connect 256 to the GPUs 240s. Each PCIe switch 220 includes one or more downstream ports that connects 254 to the PCIe slots 252. Each PCIe switch 200 further includes an upstream port that connects 252 to a CPU 210.

Each PCIe switch 220 is connected to a management controller (not shown) that dynamically sets each of the ports of the PCIe switch 220 as an upstream port (i.e., towards a processor) or a downstream port (i.e., towards a PCIe endpoint) in the system configuration 200 shown in FIG. 2.

Figure 3:
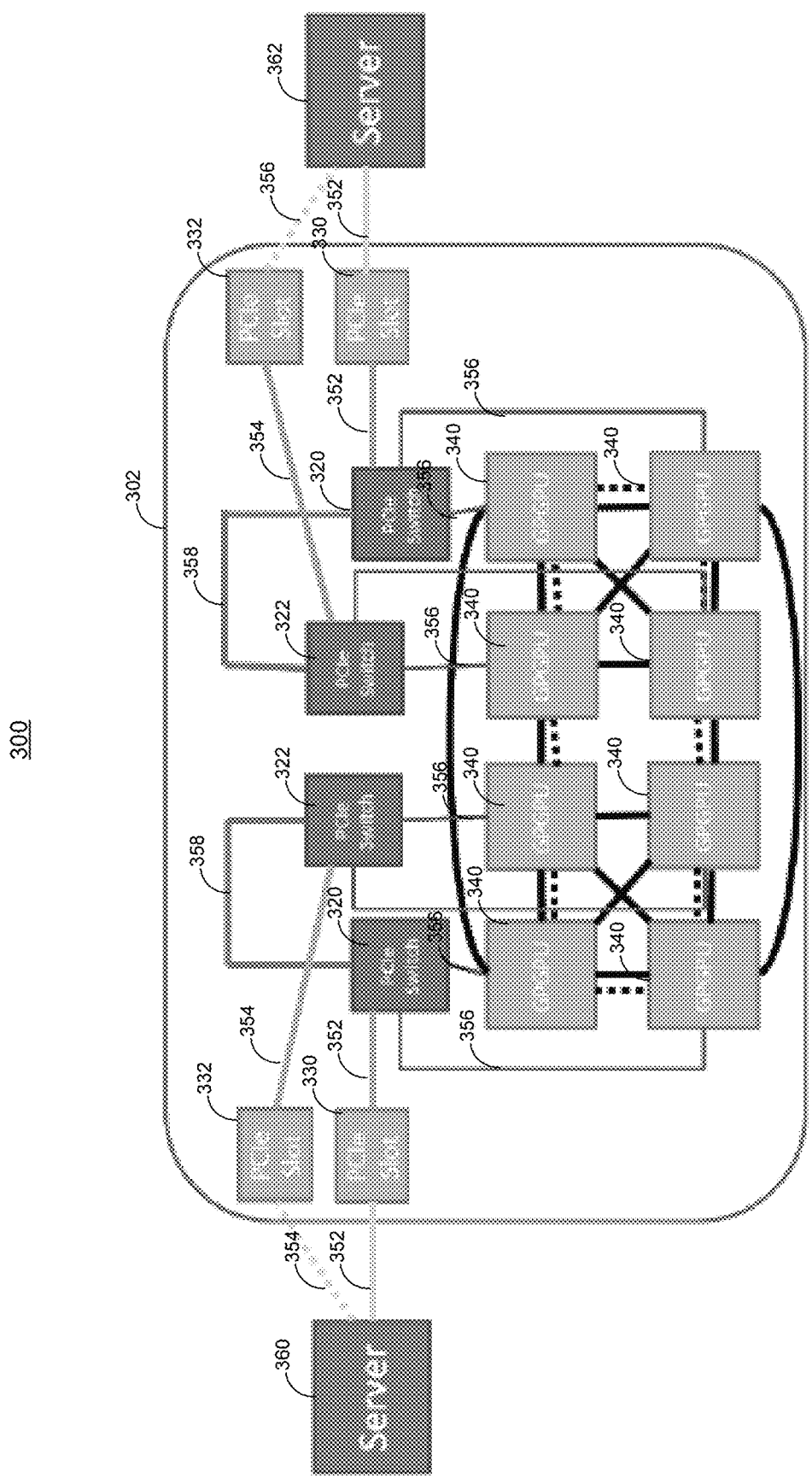
FIG. 3 illustrates a block diagram of a second example system configuration for dynamic reconfiguration of peripheral bus switches.

FIG. 3 illustrates a block diagram of a second example system configuration 300 for dynamic reconfiguration of peripheral bus switches. A server 302 includes PCIe switches 320, 322, PCIe slots 330, 332, and GPUs 340. The system configuration 300 differs from the system configuration 200 in that two of the PCIe slots 330, 332 of the server 302 are connected to other servers 360, 362. In some implementations, the server 302 can be the same as the sever 202. In some implementations, the server 302 does not include any CPUs. The server 302 can provide GPU resources to the other servers 360, 362. A first server 360 connects to the server 302 by one of PCIe slot 330 or PCIe slot 332. A second server 362 connects to the server 302 by one of PCIe slot 330 or PCIe slot 332.

The PCIe switches 320, 322 direct data between the other servers 360, 362, the PCIe slots 330, 332, and the GPUs 340. Each PCIe switch 320, 322 includes multiple ports for connecting to other components in the system. Each PCIe switch 320, 322 includes one or more downstream ports that connect 356 to the GPUs 340s. In some implementations, each PCIe switch 320, 322 further includes a downstream port for connecting 358 to another PCIe switch 320, 322.

In some implementations, the first server 360 connects 352 to an upstream port of PCIe switch 320 by PCIe slot 330. The second server 362 connects 352 to an upstream port of PCIe switch 320 by PCIe slot 330. Only one upstream connection 352 is needed for each of the first server 360 and the second server 362. Thus, only one upstream port on one PCIe switch 320 is needed for each of the first server 360 and the second server 362. All other ports for the PCIe switches 320, 322 are set as downstream ports. The PCIe slots 332 not connected to the first server 360 or the second server 362 connect to downstream ports of PCIe switches 322.

In some other implementations, the first server 360 connects 354 to PCIe switch 322 by PCIe slot 332. The second server 362 connects 354 to an upstream port of PCIe switch 322 by PCIe slot 332. The PCIe slots 330 not connected to the first server 360 or the second server 362 connect to the downstream ports of PCIe switches 320.

Each PCIe switch 320, 322 is connected to a management controller (not shown) that dynamically sets each of the ports of the PCIe switch 320, 322 as an upstream port (i.e., towards a processor of the first server 360 or the second server 362) or a downstream port (i.e., all other ports) in the system configuration 300 shown in FIG. 3.

Figure 4:
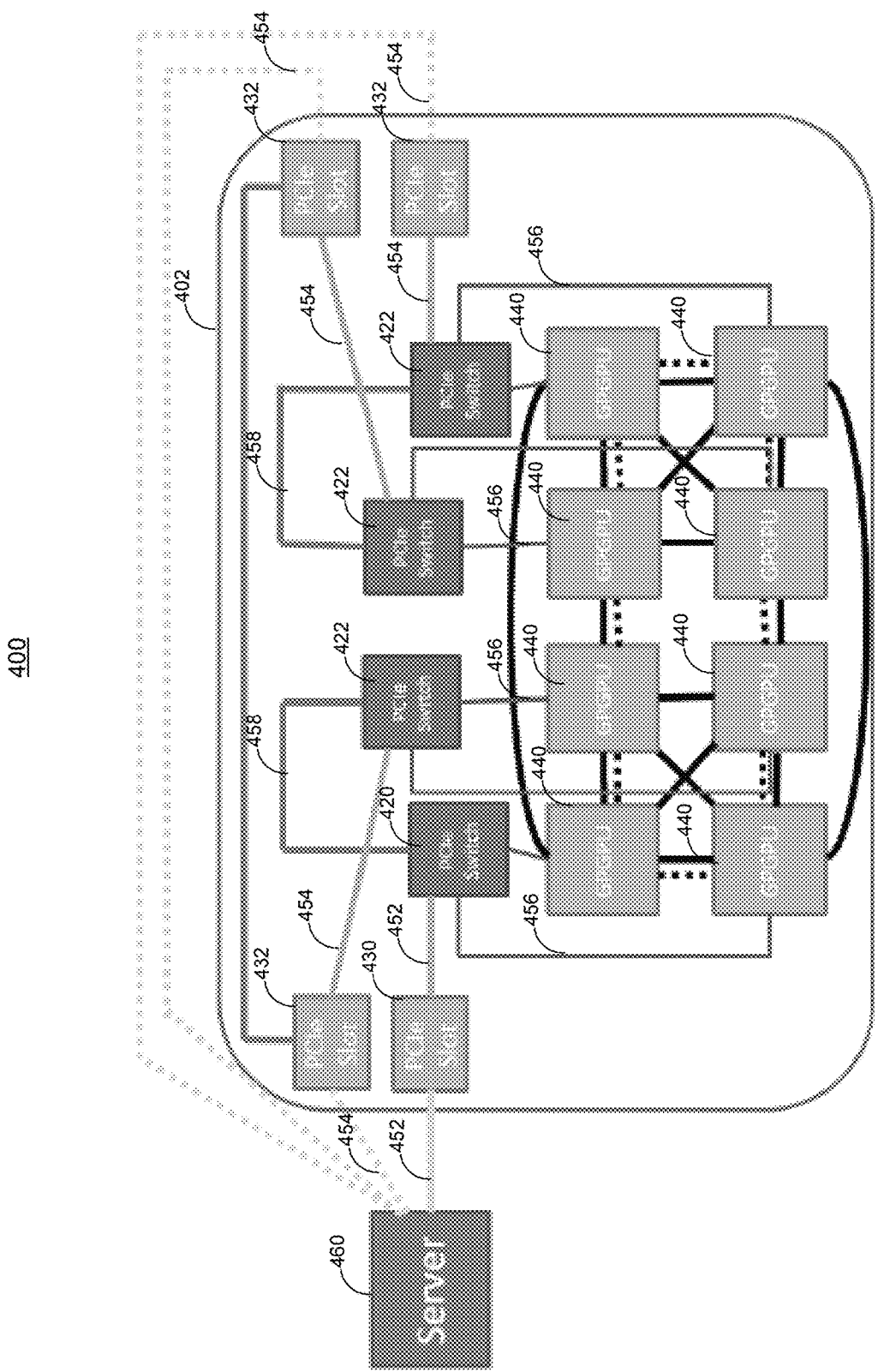
FIG. 4 illustrates a block diagram of a third example system configuration for dynamic reconfiguration of peripheral bus switches.

FIG. 4 illustrates a block diagram of a third example system configuration 400 for dynamic reconfiguration of peripheral bus switches. A server 402 includes PCIe switches 420, 422, PCIe slots 430, 432, and GPUs 440. The system configuration 400 differs from the system configuration 300 in that one PCIe slot 430, 432 is connected to one server 460. In some implementations, the server 402 can be the same as the sever 302. In some implementations, the server 402 does not include any CPUs. The server 402 can provide GPU resources to the servers 460. A server 460 connects to the server 402 by any one of the four PCIe slots 430, 432.

The PCIe switches 420, 422 direct data between the servers 460, the PCIe slots 430, 432, and the GPUs 440. Each PCIe switch 420, 422 includes multiple ports for connecting to other components in the system. Each PCIe switch 420, 422 includes one or more downstream ports that connect 456 to the GPUs 440s. In some implementations, each PCIe switch 420, 422 further includes a downstream port for connecting 458 to another PCIe switch 420, 422.

In some implementations, the server 460 connects 452 to an upstream port of PCIe switch 420 by PCIe slot 430. Only one upstream connection 452 is needed for the server 460. Thus, only one upstream port on one PCIe switch 420 is needed for the server 460. All other ports for the PCIe switches 420, 422 are set as downstream ports. The PCIe slots 432 not connected to the server 460 connect to downstream ports of PCIe switches 422.

In some other implementations, the server 460 connects 454 to one of the PCIe switches 422 by one of the PCIe slots 432. The PCIe slots not connected to the server 460 connect to the downstream ports of the PCIe switches.

Each PCIe switch 420, 422 is connected to a management controller (not shown) that dynamically sets each of the ports of the PCIe switch 420, 422 as an upstream port (i.e., towards a processor of the server 460) or a downstream port (i.e., all other ports) in the system configuration 400 shown in FIG. 4.

Figure 5:
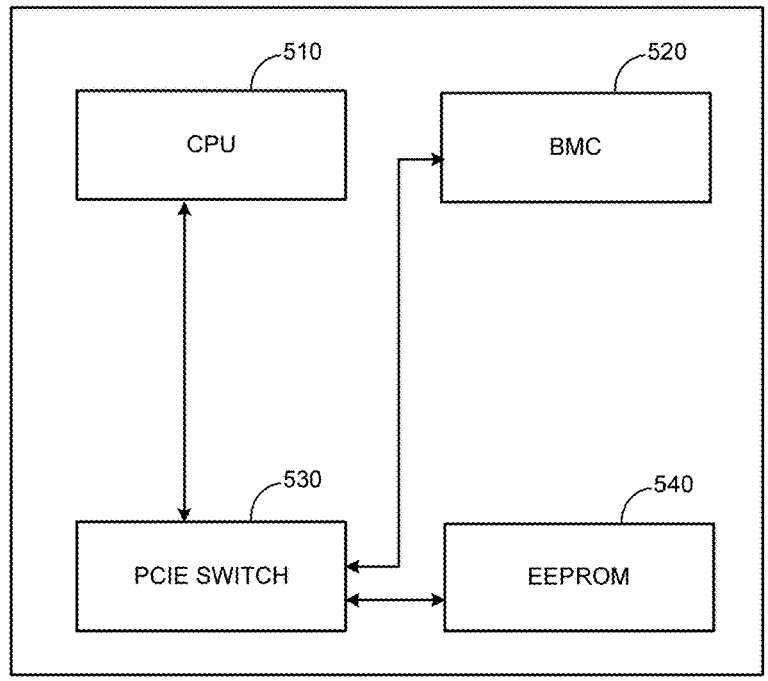
FIG. 5 illustrates a block diagram of a first example server for storing a system configuration.

FIG. 5 illustrates a block diagram of a first example server 500 for storing a system configuration. The server 500 includes a CPU 510, a baseboard management controller (BMC) 520, a PCIe switch 530, and a non-volatile memory 540.

The BMC 520 is a microcontroller that manages interfaces between system management software and platform hardware. In some implementations, each BMC 520 can manage hardware components within the server 500, such as processors, memory, storage devices, PSUs, fans, boards, etc.

The BMC 520 is part of an Intelligent Platform Management Bus (IPMB) sub-system 204. The IPMI sub-system can operate independent of the rest of the server 500 and can function even when the server 500 is powered down or shut off. The IPMI sub-system can operate even on standby power or in a low-power mode while the server 500 is shut down.

The BMC 520 communicates with the various server components that the BMC 520 manages using the IPMI protocol. IPMI is a set of specifications for an autonomous computer subsystem that manages and monitors a computer system's CPU, firmware, and OS, and for out-of-band management and monitoring by system administrators. The BMC 520 can connect to the various server components (e.g., southbridge 240 or NIC 270) using any bus interface such as the system management bus (SMBus), RS-232 serial bus, Inter-Integrated Circuit (IIC or I2C) protocol, Ethernet, IPMB, low-pin count (LPC) bus, etc. The I2C protocol features a multi-master, multi-slave, single-ended, serial computer bus that uses a Serial Data Line and a Serial Clock Line with a 7-bit or a 10-bit address space. The SMBus protocol features a single-ended, two-wire bus derived from I2C protocol and uses I2C hardware and I2C addressing. The IPMB is an I2C based serial bus for connecting various boards within the server. In some implementations, the BMC 520 communicates with the PCIe switch 530, using an I2C protocol.

The BMC 520 detects whether a server system is connected to each peripheral bus slot of the system and selects a peripheral bus switch topology for the at least one peripheral bus switch, based on the detecting. The BMC 520 sets each port of the at least one peripheral bus switch to either an upstream port configuration or a downstream port configuration, based on the peripheral bus switch topology.

In some implementations, the BMC 520 stores a detected configuration (i.e., whether and where others servers are connected to the server 500 through one or more peripheral bus slots) to the non-volatile memory 540 for later recovery and use.

For example, if the BMC 520 detects only a single server system connected to a peripheral bus slot of the system, the BMC 520 selects a peripheral bus switch topology that sets one port to the upstream port configuration and sets all other ports to the downstream port configuration.

If the BMC 520 detects that a first peripheral bus slot is connected to a first server system and a second peripheral bus slot is connected to a second server system, the BMC 520 selects a peripheral bus switch topology that sets 1) a first port of the at least one peripheral bus switch connected to the first peripheral bus slot to the upstream port configuration, 2) a second port of the at least one peripheral bus switch connected to the second peripheral bus slot to the upstream port configuration, and 3) all other ports to the downstream port configuration.

If the BMC 520 detects that no peripheral bus slot is connected to a server system, the BMC 520 selects a peripheral bus switch topology that sets at least one peripheral bus switch to each connect to a CPU of the server 500.

In some implementations, the BMC 520 sends an Inter-Integrated Circuit (I$^2$C) signal to a peripheral bus switch. The peripheral bus switch 530 writes the server configuration into the non-volatile memory 540.

Figure 6:
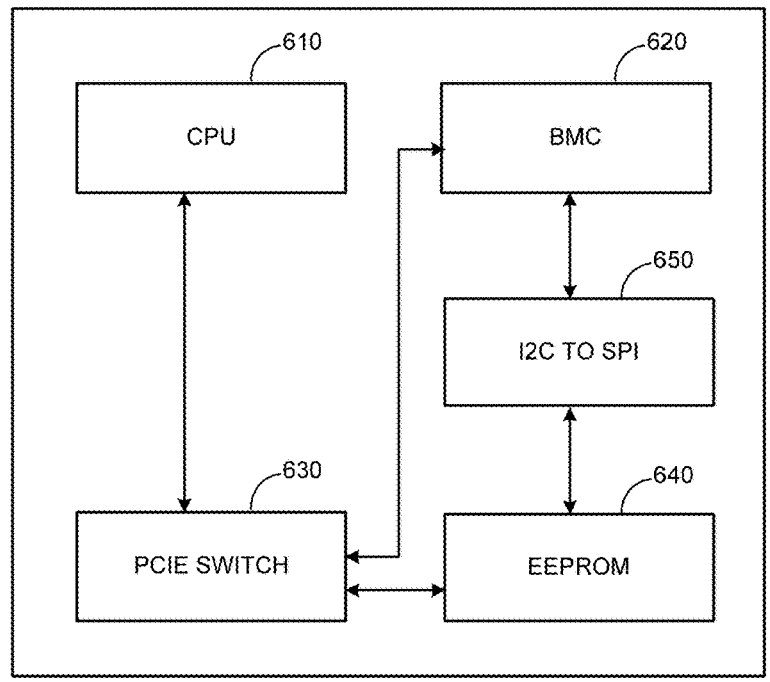
FIG. 6 illustrates a block diagram of a second example server for storing a system configuration.

FIG. 6 illustrates a block diagram of a second example server 600 for storing a system configuration. The server 600 includes a CPU 610, a baseboard management controller (BMC) 620, a PCIe switch 630, an I$^2$C to Serial Peripheral Interface (SPI) bridge 650, and a non-volatile memory 640. The server 600 differs from the server 500 of FIG. 5 in that the BMC 620 stores the server configuration by sending an Inter-Integrated Circuit (I$^2$C) signal to an I$^2$C to the SPI bridge 650. The SPI bridge 650 converts a SPI signal to write the server configuration into the non-volatile memory 640.

FIG. 7 illustrates an example method for dynamic reconfiguration of peripheral bus switches, by a management controller (e.g. the BMC 520 of FIG. 5 or the BMC 620 of FIG. 6). At step 710, the management controller detects whether a server system is connected to each peripheral bus slot of the system.

At step 720, the management controller selects a peripheral bus switch topology for the at least one peripheral bus switch, based on the detecting.

At step 730, the management controller sets each port of the at least one peripheral bus switch to either an upstream port configuration or a downstream port configuration, based on the peripheral bus switch topology.

Figure 8:
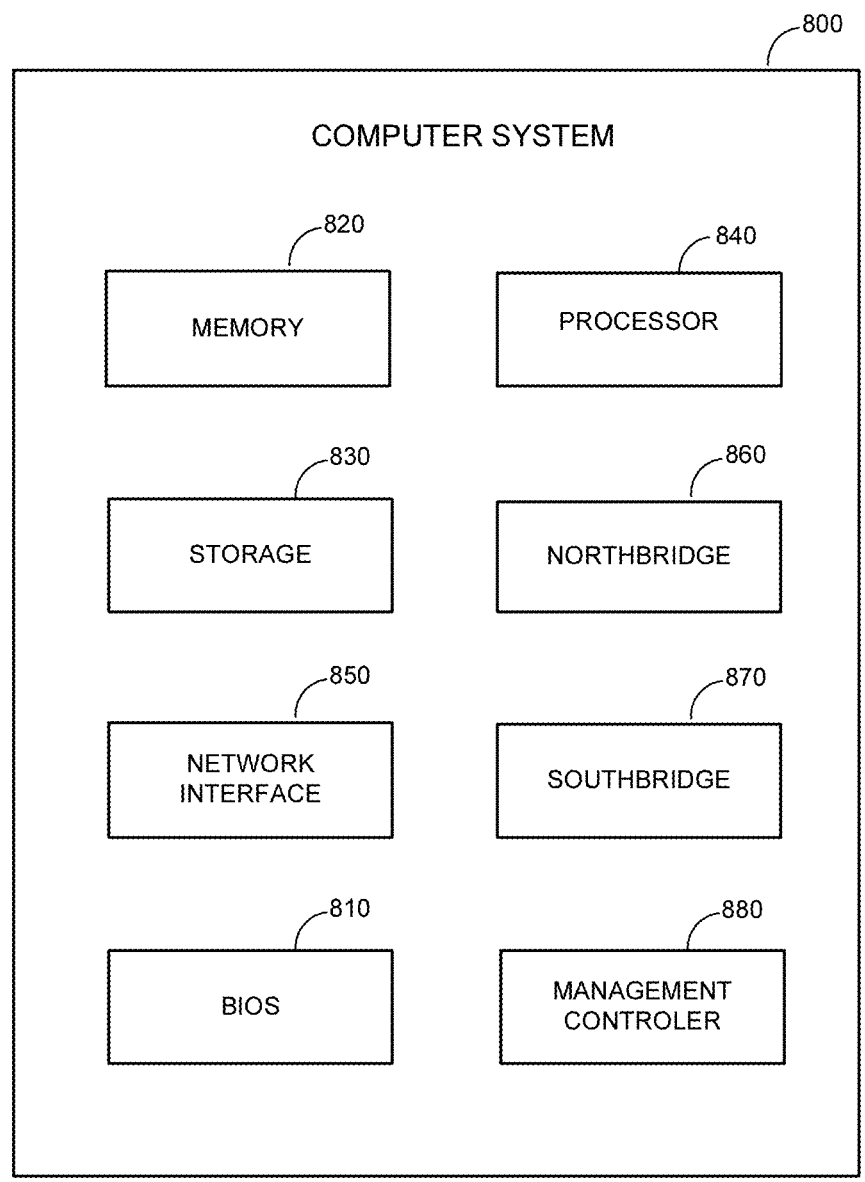
FIG. 8 illustrates a block diagram of an example computer system.

FIG. 8 illustrates a block diagram of an example computer system 800. The computer system 800 includes a processor 840, a network interface 850, a management controller 880, a memory 820, a storage 830, a BIOS 810, a northbridge 860, and a southbridge 870.

The computer system 800 is, for example, a server (e.g., a server in a server rack of a data center) or a personal computer. The processor (e.g., central processing unit (CPU)) 840 is a chip on a motherboard that retrieves and executes programming instructions stored in the memory 820. The processor 840 is a single CPU with a single processing core, a single CPU with multiple processing cores, or multiple CPUs. One or more buses (not shown) transmit instructions and application data between various computer components such as the processor 840, memory 820, storage 830, and networking interface 850.

The memory 820 includes any physical device used to temporarily or permanently store data or programs, such as various forms of random-access memory (RAM). The storage 830 includes any physical device for non-volatile data storage such as a HDD or a flash drive. The storage 830 can have a greater capacity than the memory 820 and can be more economical per unit of storage, but can also have slower transfer rates.

The BIOS 810 includes a Basic Input/Output System or its successors or equivalents, such as an Extensible Firmware Interface (EFI) or Unified Extensible Firmware Interface (UEFI). The BIOS 810 includes a BIOS chip located on a motherboard of the computer system 800 storing a BIOS software program. The BIOS 810 stores firmware executed when the computer system is first powered on along with a set of configurations specified for the BIOS 810. The BIOS firmware and BIOS configurations are stored in a non-volatile memory (e.g., NVRAM) or a ROM such as flash memory. Flash memory is a non-volatile computer storage medium that can be electronically erased and reprogrammed.

The BIOS 810 is loaded and executed as a sequence program each time the computer system 800 is started. The BIOS 810 recognizes, initializes, and tests hardware present in a given computing system based on the set of configurations. The BIOS 810 performs self-test, such as a Power-on-Self-Test (POST), on the computer system 800. This self-test tests functionality of various hardware components such as hard disk drives, optical reading devices, cooling devices, memory modules, expansion cards and the like. The BIOS addresses and allocates an area in the memory 820 in to store an operating system. The BIOS 810 then gives control of the computer system to the OS.

The BIOS 810 of the computer system 800 includes a BIOS configuration that defines how the BIOS 810 controls various hardware components in the computer system 800. The BIOS configuration determines the order in which the various hardware components in the computer system 800 are started. The BIOS 810 provides an interface (e.g., BIOS setup utility) that allows a variety of different parameters to be set, which can be different from parameters in a BIOS default configuration. For example, a user (e.g., an administrator) can use the BIOS 810 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 880 is a specialized microcontroller embedded on the motherboard of the computer system. For example, the management controller 880 is a baseboard management controller (BMC). The management controller 880 manages the interface between system management software and platform hardware. Different types of sensors built into the computer system report to the management controller 880 on parameters such as temperature, cooling fan speeds, power status, operating system status, etc. The management controller 880 monitors the sensors and has the ability to send alerts to an administrator via the network interface 850 if any of the parameters do not stay within preset limits, indicating a potential failure of the system. The administrator can remotely communicate with the management controller 880 to take some corrective action such as resetting or power cycling the system to restore functionality.

The northbridge 860 is a chip on the motherboard that can be directly connected to the processor 840 or is integrated into the processor 840. In some instances, the northbridge 860 and the southbridge 870 is combined into a single die. The northbridge 860 and the southbridge 870, manage communications between the processor 840 and other parts of the motherboard. The northbridge 860 manages tasks that require higher performance than the southbridge 870. The northbridge 860 manages communications between the processor 840, the memory 820, and video controllers (not shown). In some instances, the northbridge 860 includes a video controller.

The southbridge 870 is a chip on the motherboard connected to the northbridge 860, but unlike the northbridge 860, need not be directly connected to the processor 840. The southbridge 870 manages input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 800. The southbridge 870 connects to or includes within the southbridge 870 the management controller 870, Direct Memory Access (DMAs) controllers, Programmable Interrupt Controllers (PICs), and a real-time clock. In some instances, the southbridge 870 directly connects to the processor 840, such as in the case where the northbridge 860 is integrated into the processor 840. In some sytems, the northbridge 860 and the southbridge 870 can be combined into a single die, such as for example into a platform controller hub (PCH).

The networking interface 850 is any interface that supports wired or wireless Local Area Networks (LANs) or Wide Area Networks (WANs), such as Ethernet, Fibre Channel, Wi-Fi, Bluetooth, Firewire, the Internet, etc. For example, the networking interface 850 can include a network interface controller (NIC) for Ethernet. Ethernet has been the most widely used networking standard for connecting computers in both Local Area Networks (LANs) and Wide Area Networks (WANs). Ethernet defines a number of wiring and signaling standards for the physical layer (PHY), through means of network access at the Media Access Control (MAC)/Data Link Layer, and through a common addressing format. Ethernet enabled devices typically communicate by transmitting data packets, which comprise blocks of data that are individually sent and delivered.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor is a microprocessor, or in the alternative, any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and write information to, the storage medium. In the alternative, the storage medium is integral to the processor. The processor and the storage medium resides in an ASIC. The ASIC resides in a user terminal. In the alternative, the processor and the storage medium resides as discrete components in a user terminal.

In one or more exemplary designs, the functions described is implemented in hardware, software, firmware, or any combination thereof. If implemented in software, the functions are stored on or transmitted over as one or more instructions or code on a non-transitory computer-readable medium. Non-transitory computer-readable media includes both computer storage media and communication media including any medium that facilitates transfer of a computer program from one place to another. A storage media is any available media that can be accessed by a general purpose or special purpose computer. By way of example, and not limitation, such computer-readable media includes RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method, comprising:
   detecting, by a management controller of a system, whether a server system is connected to each peripheral bus slot of the system;
   selecting a peripheral bus switch topology for at least one peripheral bus switch, based on the detecting;
   dynamically reconfiguring the at least one peripheral bus switch by setting each port of the at least one peripheral bus switch to either an upstream port configuration or a downstream port configuration, based on the peripheral bus switch topology, only one port of each peripheral bus switch of the at least one peripheral bus switch being set as an upstream port, and at least two ports of each peripheral bus switch of the at least one peripheral bus switch being set as downstream ports;
   storing, by the management controller, a server configuration for server location and server quantity, to a non-volatile memory; and
   reading the server configuration from the non-volatile memory of the system;
   wherein the peripheral bus switch topology sets one port of the at least one peripheral bus switch to the upstream port configuration and sets all other ports of the at least one peripheral bus switch to the downstream port configuration, in response to detecting only a single server system connected to a peripheral bus slot of the system.

2. The method of claim 1, wherein the upstream port configuration is for connecting to a root complex (RC).

3. The method of claim 1, wherein the downstream port configuration for connecting to a peripheral bus endpoint.

4. The method of claim 1, wherein the peripheral bus switch topology sets the at least one peripheral bus switch to each connect to a central processing unit of the system, in response to detecting that no peripheral bus slot is connected to a server system.

5. The method of claim 1, wherein the peripheral bus switch topology sets:
   a first port of the at least one peripheral bus switch connected to a first peripheral bus slot to the upstream port configuration,
   a second port of the at least one peripheral bus switch connected to a second peripheral bus slot to the upstream port configuration, and
   all other ports to the downstream port configuration, in response to detecting that the first peripheral bus slot is connected to a first server system and the second peripheral bus slot is connected to a second server system.

6. The method of claim 1, wherein storing the server configuration comprises sending an Inter-Integrated Circuit (I2C) signal to an I2C to a Serial Peripheral Interface (SPI) bridge for conversion to a SPI signal to write the server configuration into the non-volatile memory.

7. The method of claim 1, wherein storing the server configuration comprises sending an Inter-Integrated Circuit (I2C) signal to a peripheral bus switch, wherein the peripheral bus switch writes the server configuration into the non-volatile memory.

8. A system, comprising:
   at least one peripheral bus switch, each connected to a peripheral bus slot;
   at least one graphics processing unit connected to a downstream port of the at least one peripheral bus switch; and
   a management controller connected to the at least one peripheral bus switch and configured to dynamically reconfigure the at least one peripheral bus switch, the management controller configured to:
   detect whether a server system is connected to each peripheral bus slot;
   select a peripheral bus switch topology for the at least one peripheral bus switch, based on whether the server system is connected to each peripheral bus slot;
   set each port of the at least one peripheral bus switch to either an upstream port configuration or a downstream port configuration, based on the peripheral bus switch topology, only one port of each peripheral bus switch of the at least one peripheral bus switch being set as the upstream port, and at least two ports of each peripheral bus switch of the at least one peripheral bus switch being set as downstream ports;

store a server configuration for server location and server quantity, to a non-volatile memory; and read the server configuration from the non-volatile memory of the system;

wherein the peripheral bus switch topology sets one port of the at least one peripheral bus switch to the upstream port configuration and sets all other ports of the at least one peripheral bus switch to the downstream port configuration, in response to detecting only a single server system connected to a peripheral bus slot of the system.

9. The system of claim 8, wherein the upstream port configuration is for connecting to a root complex (RC).

10. The system of claim 8, wherein the downstream port configuration for connecting to a peripheral bus endpoint.

11. The system of claim 8, wherein the peripheral bus switch topology sets the peripheral bus switches to each connect to a central processing unit of the system, in response to detecting that no peripheral bus slot is connected to a server system.

12. The system of claim 8, wherein the peripheral bus switch topology sets:
a first port of the at least one peripheral bus switch connected to a first peripheral bus slot to the upstream port configuration,
a second port of the at least one peripheral bus switch connected to a second peripheral bus slot to the upstream port configuration, and
all other ports to the downstream port configuration, in response to detecting that the first peripheral bus slot is connected to a first server system and the second peripheral bus slot is connected to a second server system.

13. The system of claim 8, wherein storing the server configuration comprises sending an Inter-Integrated Circuit (I2C) signal to an I2C to a Serial Peripheral Interface (SPI) bridge for conversion to a SPI signal to write the server configuration into the non-volatile memory.

14. The system of claim 8, wherein storing the server configuration comprises sending an Inter-Integrated Circuit (I2C) signal to a peripheral bus switch, wherein the peripheral bus switch writes the server configuration into the non-volatile memory.

15. A method, comprising:
detecting, by a management controller of a system, whether a server system is connected to each peripheral bus slot of the system;
selecting a peripheral bus switch topology for at least one peripheral bus switch, based on the detecting;
dynamically reconfiguring the at least one peripheral bus switch by setting each port of the at least one peripheral bus switch to either an upstream port configuration or a downstream port configuration, based on the peripheral bus switch topology, only one port of each peripheral bus switch of the at least one peripheral bus switch being set as an upstream port, and at least two ports of each peripheral bus switch of the at least one peripheral bus switch being set as downstream ports;
storing, by the management controller, a server configuration for server location and server quantity, to a non-volatile memory;
reading the server configuration from the non-volatile memory of the system; and
sending, by the management controller, an Inter-Integrated Circuit (I$^2$C) signal to a peripheral bus switch, wherein the peripheral bus switch writes the server configuration into the non-volatile memory;
wherein the peripheral bus switch topology sets one port of the at least one peripheral bus switch to the upstream port configuration and sets all other ports of the at least one peripheral bus switch to the downstream port configuration, in response to detecting only a single server system connected to a peripheral bus slot of the system.

* * * * *